(12) United States Patent
Marcato

(10) Patent No.: US 8,162,653 B2
(45) Date of Patent: Apr. 24, 2012

(54) PASTA MACHINE FOR DOMESTIC USE WITH IMPROVED COVER

(76) Inventor: Pietro Marcato, Campodarsego (IT)

( * ) Notice: Subject to any disclaimer, the term of this patent is extended or adjusted under 35 U.S.C. 154(b) by 272 days.

(21) Appl. No.: 12/671,017

(22) PCT Filed: Jul. 28, 2008

(86) PCT No.: PCT/IB2008/001969
§ 371 (c)(1),
(2), (4) Date: Jan. 27, 2010

(87) PCT Pub. No.: WO2009/016465
PCT Pub. Date: Feb. 5, 2009

(65) Prior Publication Data
US 2010/0196529 A1  Aug. 5, 2010

(30) Foreign Application Priority Data

Jul. 31, 2007  (IT) .............................. PD2007A0260

(51) Int. Cl.
*A21C 3/02*  (2006.01)
(52) U.S. Cl. ........................... 425/472; 99/353; 425/363
(58) Field of Classification Search .................. 425/363, 425/472; 99/353
See application file for complete search history.

(56) References Cited

U.S. PATENT DOCUMENTS

| 4,332,539 | A | * | 6/1982 | Zani | 425/151 |
| 5,460,506 | A | * | 10/1995 | Price et al. | 99/353 |
| 5,486,100 | A | * | 1/1996 | Hsu | 99/353 |
| 5,770,239 | A | * | 6/1998 | Ancona | 99/353 |
| 6,698,338 | B2 | * | 3/2004 | Ancona et al. | 99/353 |
| 6,743,007 | B2 | * | 6/2004 | Backus et al. | 425/192 R |
| 7,238,017 | B2 | * | 7/2007 | Marcato | 425/363 |

FOREIGN PATENT DOCUMENTS

| CN | 62-19042 | 1/1987 |
| DE | G3703777.7 | 10/1987 |
| EP | 0820696 A1 | 1/1998 |
| EP | 1597972 A2 | 11/2005 |
| WO | 02/49439 A1 | 6/2002 |

* cited by examiner

*Primary Examiner* — James Mackey
(74) *Attorney, Agent, or Firm* — QuickPatents, Inc.; Kevin Prince

(57) ABSTRACT

The item in subject is a pasta machine for domestic use, in which the surfaces of the various parts of the housing are composed of a microporous layer of aluminum oxide and completed with sealing of the micropores for hydration thus obtaining a micro-roughness with nonstick properties enabling the working of moist pasta.

8 Claims, 6 Drawing Sheets

PASTA MACHINE FOR DOMESTIC USE WITH IMPROVED COVER

CROSS-REFERENCE TO RELATED APPLICATIONS

This application claims the benefit of PCT Patent Application PCT/IB2008/001969, filed on 28 Jul. 2008, and Italian Patent Application PD 2007 A 000260, filed on 31 Jul. 2007, both incorporated herein by reference.

STATEMENT REGARDING FEDERALLY SPONSORED RESEARCH AND DEVELOPMENT

Not Applicable.

FIELD OF THE INVENTION

This invention relates to pasta machines, and more particularly to a housing surface of a pasta machine.

DISCUSSION OF RELATED ART

Pasta machines for domestic use are well known in the art. They are made up of a roller bearing structure, consisting of one based and two shoulders; completing the machine are the guards that prevent access to the mechanisms and case (or carters) that leave the channel open to the pasta to be worked. The pasta is introduced between the (adjustable) spacing of the two rollers to enable rolling.

Pasta machines are also provided with additional parts for scraping the rollers in case residues of the pasta being worked remain attached to the roller. All the above-mentioned parts are currently made of chromate or varnished steel. Such machines substantially present two types of inconveniences. One concerns functionality and the other health.

The inconvenience concerning functionality is the following: It is known that the pasta to be worked is obtained by kneading flour and eggs (and/or water) and needs to be reduced to the thickness desired by adjusting the distance between the two smooth rollers. Once a regular layer of pasta has been obtained, it is passed through the grooved rotating rollers for the pasta to be cut into the usual forms of pasta such as tagliatelle, fettuccine, trenette, etc.

The pasta, in order to be rolled out or cut, must not be dry, but must contain a certain quantity of moisture released by the eggs or the water in the mixture. This mixture creates a certain adhesion between the pasta and the machine parts which, as said, are typically made of chromate or varnished steel cases (carters). This adhesion impedes the smooth running of the pasta which should instead be running smoothly, and even, at times, cause the strip of pasta to break transversally. The consumer, in this case, will be unsatisfied and will have to start the rolling process again.

The other type of inconvenience is a health concern, which occurs on the varnished machines currently used. The varnished machines may release particles (or components) of the varnish onto the pasta as it comes into contact with the machine. This release of contaminated particles could in time be harmful to the health of the consumer who will not be aware immediately of the harmfulness.

Therefore, there is a need for a device that will minimize the problem of the pasta adhering to parts of the pasta machine when running through the machine. Also, there is a need for a device that minimizes the release of harmful particles onto the pasta as it passes through the machine. The present invention accomplishes these objectives.

SUMMARY OF THE INVENTION

The present device is a pasta machine for domestic use with improved housing.

The surfaces of the housing are finished in such a way as to prevent particles of pasta or dough from sticking to the parts or components. Furthermore, the hardness of the surfaces is such that they will last in time and, therefore, their characteristic is that of not leaving particles on the pasta during working. Apart from surface hardness, the material used for this purpose also has a sub-layer with hardness that gradually diminishes down to the hardness of the base metal itself for which the entirety of its characteristics, such as tenacity and tolerance, can be matched up only with those of steel.

For this purpose, the material utilized is aluminum (or aluminum alloy) treated as described here below. The parts of the housing are hung from a frame to be immersed in a bath for the following treatments that are of both a chemical and an electrolytic type. Firstly surfactant degreasing is carried out. Then glazing is carried out in a hot bath (at approx. 50° C.) containing dissolved aluminum and caustic soda, thus obtaining leveling or smoothing of the surface. After rinsing, de-coating or depatination is carried out in an acid solution. The above-mentioned parts of housing are then treated with a suitable process of electrolytic anodizing, thus obtaining a thin coating which, well anchored to the base, gradually increases the hardness close to the surfaces.

The previous electrochemical treatment of the leveled surface causes the surface to be microporous. Following this is a chemical treatment. After a series of washings at room temperature, the parts are immersed in a hot bath of demineralized water at approximately 90° C. Thus "sealing" of the micropores is obtained with a process of hydration. A surface finishing is obtained which enables the pasta to run smoothly without the occurrence of adhesion. Surface solidity and hardness prevent the particles from being released on the pasta. Another advantage of the process described above is the option of obtaining, if one wants, machine housing pigmentation, without risk of particles being released which could occur when varnishes are applied.

In fact, before sealing it is possible to immerse the various parts in baths of organic pigments (of the type provided for food) which are gradually introduced into the pore cavities. The shade of color desired depends on how long the parts remain in the bath.

The present invention is a device that minimizes the problem of pasta adhering to parts of the pasta machine when running through the machine. Also, the device minimizes the release of harmful particles onto the pasta as it passes through the machine. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word housings all of the following interpretations of the word: any of the items in the list, all of the items in the list and any combination of the items in the list. Any use of the word "means" herein is intended to invoke means-plus-function limitation in accordance with 35 U.S.C. §112, sixth paragraph, even if the word "means" follows words describing the function.

Figure 1:
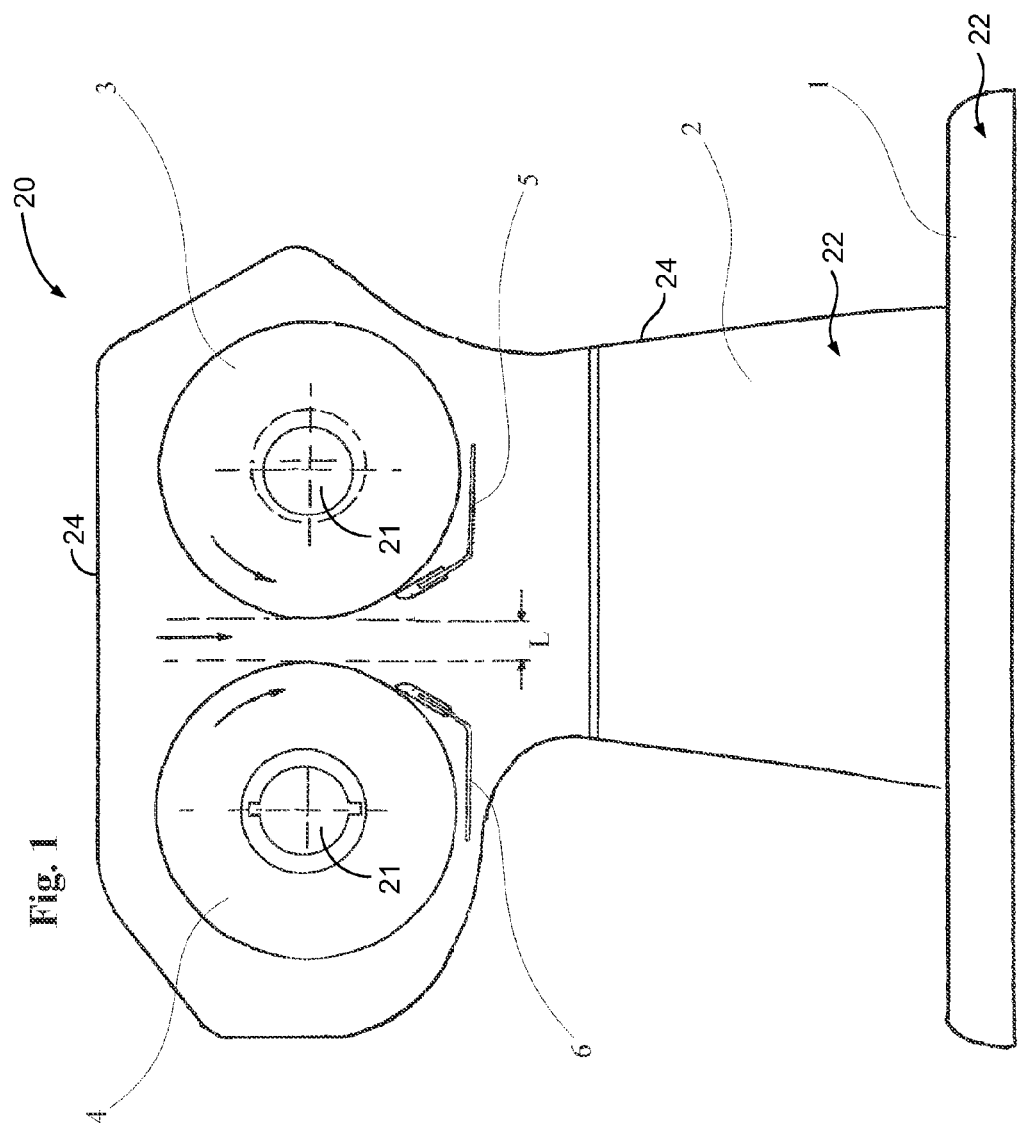
FIG. 1 is a side elevational view of a pasta machine, illustrating two rollers that roll out the pasta, with scraping laminas.
Figure 2:
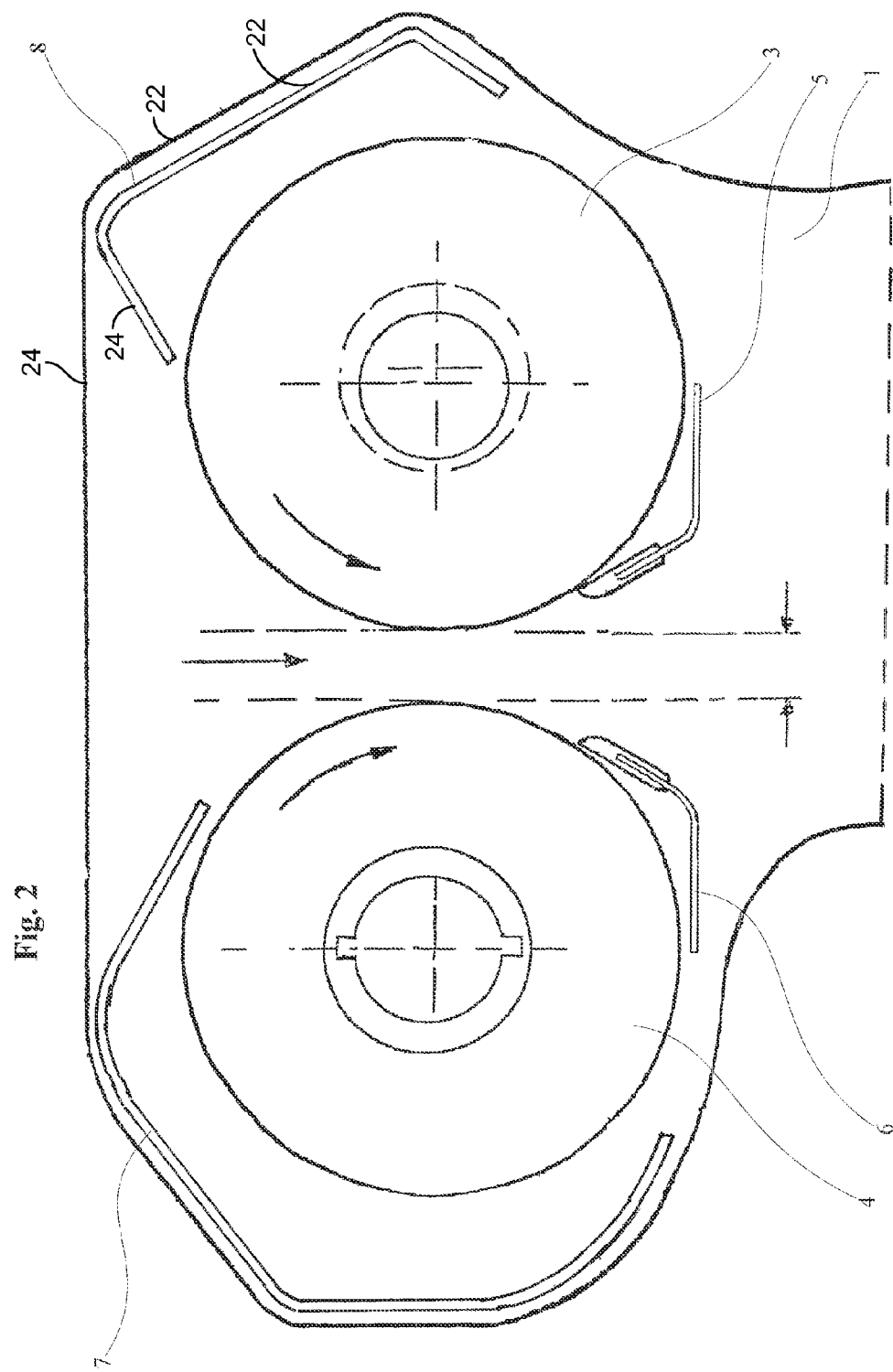
FIG. 2 is a side elevational view of a pasta machine, illustrating case (carter) parts housing the rollers.
Figure 3:
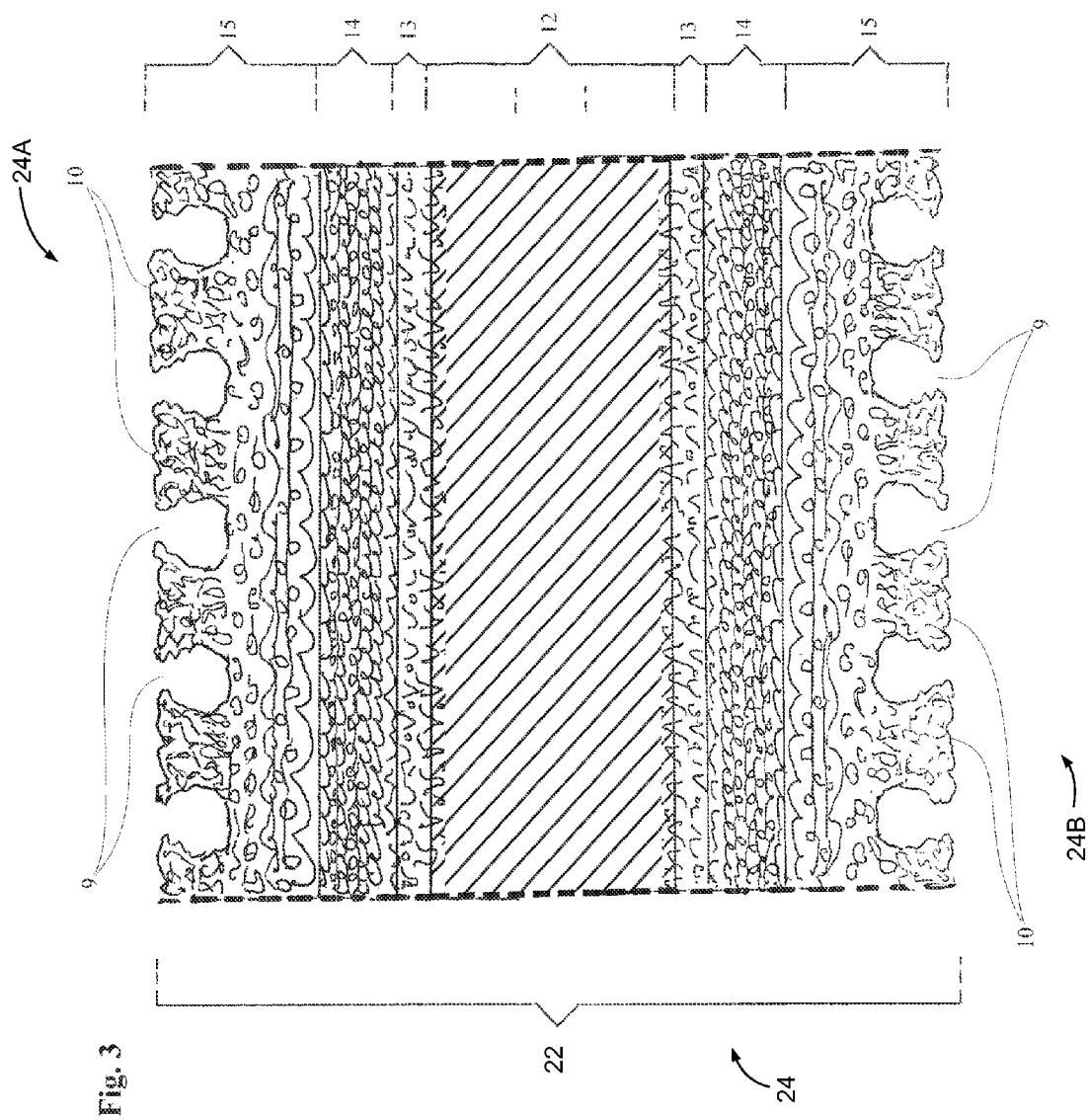
FIG. 3 is a detailed view of a sheet element of the housing, illustrating the different layers of aluminum and the presence of micropores.

With respect to the drawings, FIG. 1 illustrates a pasta machine 20 including a base 1 and two side walls 2 that rise from the base 1. Two rollers 3, 4 are connected to the side walls 2 via shafts 21 rotationally connected to each side wall 2. The pasta machine 20 further includes scraping elements 5, 6 and a gap adjuster (not shown) that adjusts the gap L by adjusting the proximity of the shafts 21. The scraping elements 5, 6 may also be referred to as scraping laminas that remove excess pasta remaining on the rollers 3,4. In FIG. 2, shaped plates 7, 8 situated above rollers 3, 4 enable the introduction of pasta (not shown) between the said rollers 3, 4 for rolling. The term pasta includes any dough-like material, including material used to make pasta, bread, or pastries, for example.

Figure 4:
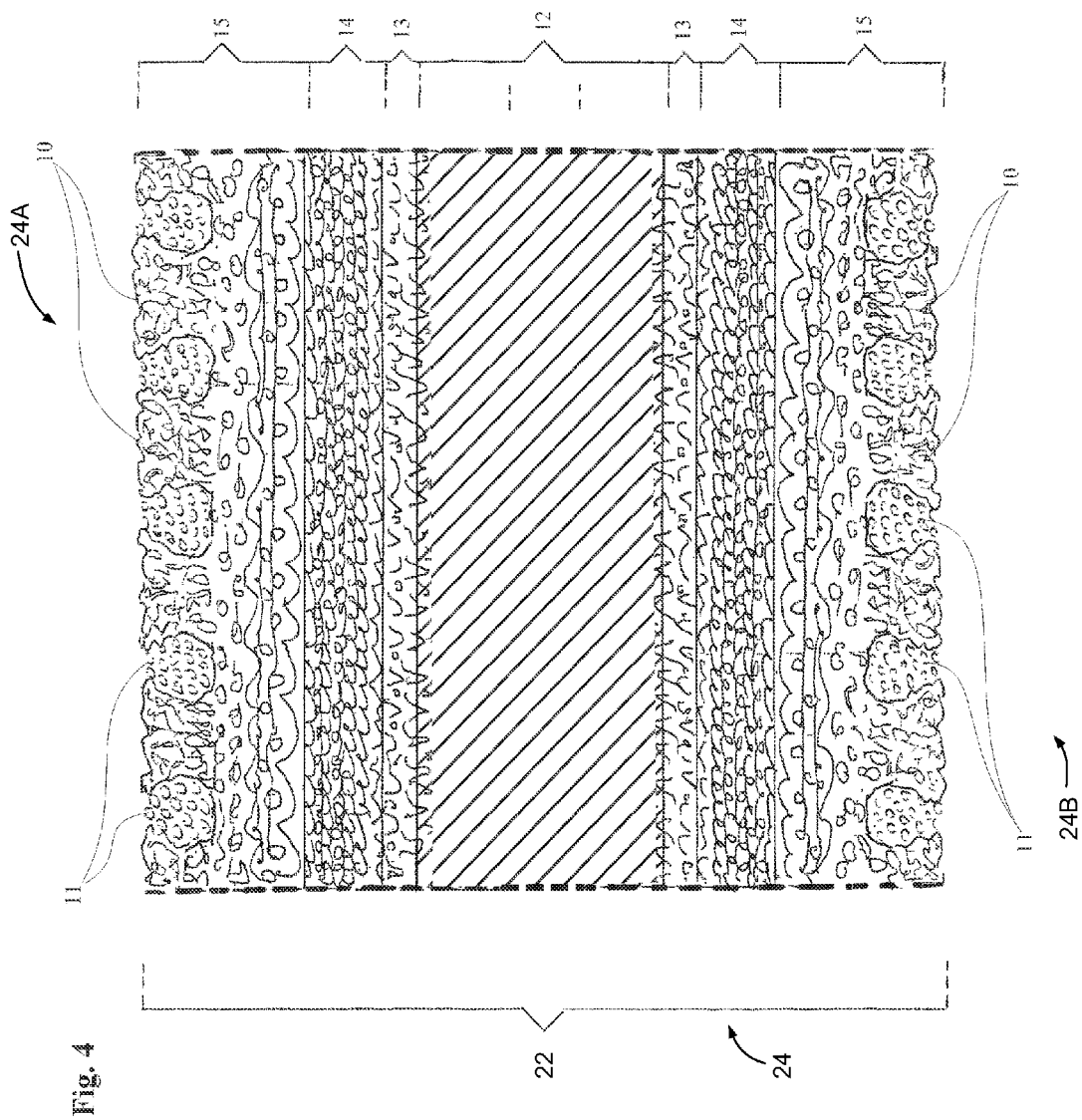
FIG. 4 is a detailed view of a sheet element of the housing, illustrating sealing of the micropores.

The term housing 22 includes parts of the pasta machine 20 that may come in contact with the pasta, for example the base 1, the side walls 2, and the shaped plates 7,8. The housing 22 is primarily made from a sheet of aluminum with an aluminum oxide layer. Aluminum oxide is an amphoteric oxide of aluminum with the chemical formula Al2O3 and is commonly referred to as alumina. In FIGS. 3-6, an aluminum sheet element 24 is utilized for the completion of the housing 22 (1, 2, 7, 8). The sheet element 24 has an outer surface 10 and includes a central zone 12, the base metal of which consists of aluminum (or aluminum alloy). The central zone 12 is marked simply with section lines in FIGS. 3-6, and does not undergo any treatment. Whereas on both sides 24a, 24b of the sheet element 24, extending from the central zone 12 outwards, three layers of anodizing stratification have been schematically illustrated in FIGS. 3-6. A first layer 13, or barrier layer, penetrates with decreasing diffusion in the base metal and determines suitable anchorage. A thin second transition layer 14 carries out an intensification of compact aluminum. A third layer 15 is differentiated by a decreasing solidity ending at the surface with a decidedly diffused microporosity creating a microroughness on the surface 10 with micropores 9. This microroughness is determined by a porous layer of aluminum in both the Al2O3 crystalline form and a layer of amorphous aluminum. With a sealing 11 of the micropores 9 the microroughness becomes almost imperceptible, as illustrated in FIGS. 4 and 6.

Figure 5:
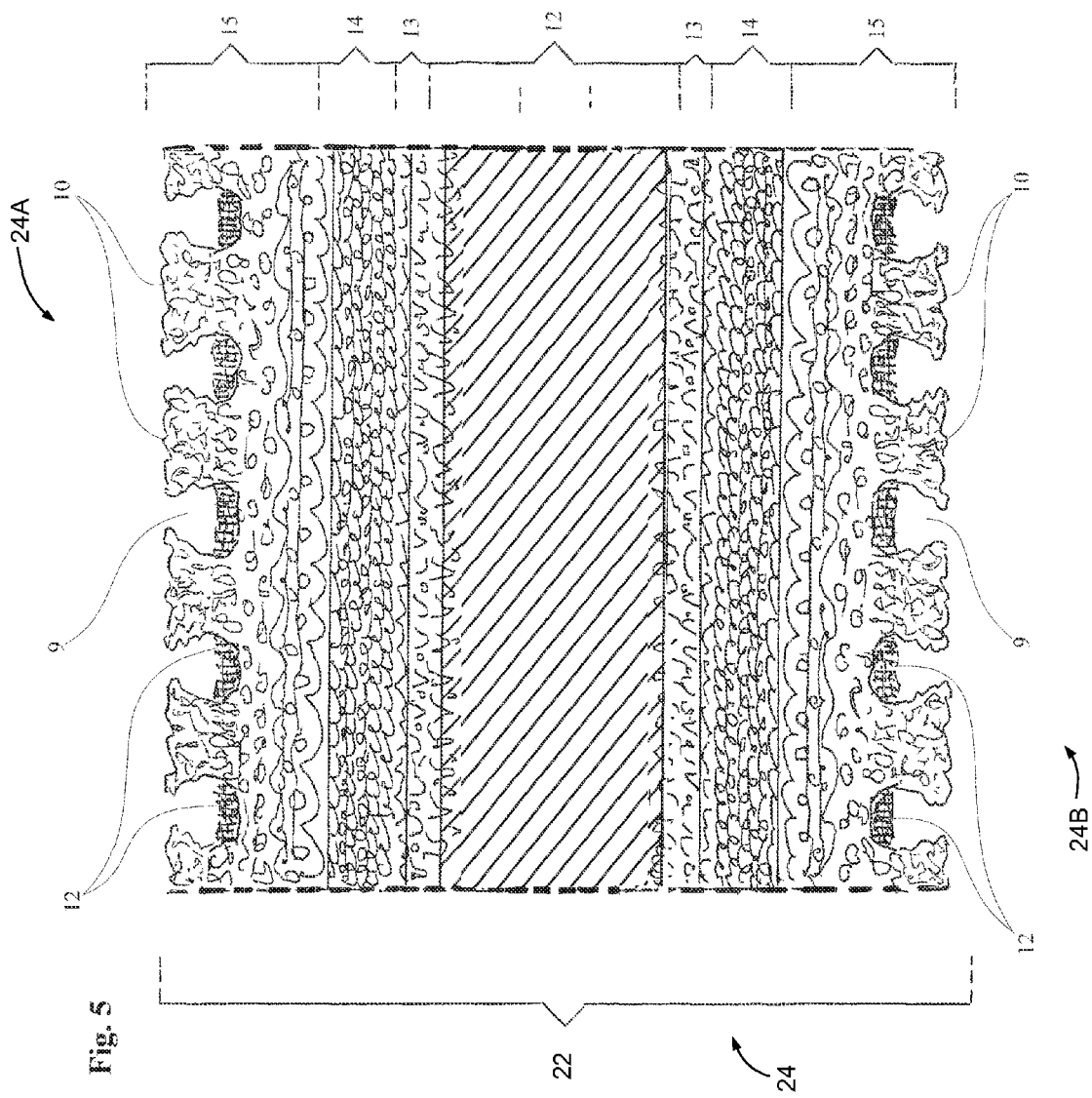
FIG. 5 is a detailed view of a sheet element of the housing, with the presence of pigmentation at the bottom of the micropores.
Figure 6:
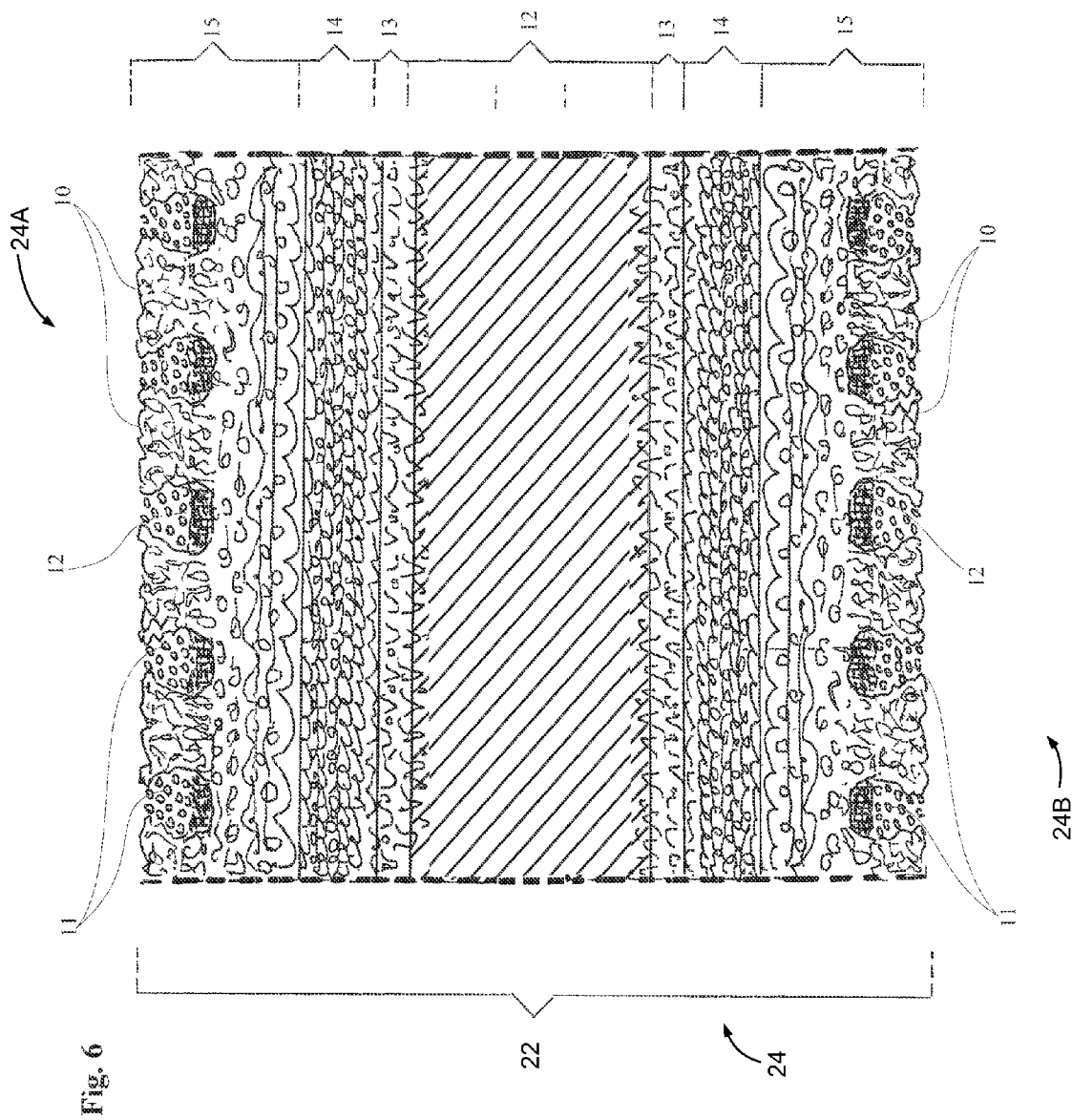
FIG. 6 is a detailed view of a sheet element of the housing, with the presence of pigmentation at the bottom of the micropores and a sealing on top of the pigmentation.

In one embodiment, illustrated in FIGS. 5 and 6, the housing 22 can be pigmented without the risk of particles being released that could occur when applying the varnishes adopted in substitution of chromium plating. This is made possible by depositing color pigments 12 (preferably of an organic type) inside the micropores 9 of the housing 22, as described previously before sealing 11.

At a quick glance, the pasta machine 20 would appear similar to prior art machines on sale (especially for machines not treated with color pigments). In actuality, the innovations to be found in this pasta machine 20 reduces the inconveniences relative to adherence of the pasta due to moisture while running over the surface 10 of the housing 22 which concerns machines found on the market with chromium-plated or varnished housing. What is more, this pasta machine 20 reduces the inconveniences relative to the release of noxious or polluting particles on the pasta that are harmful to health.

For this purpose, the material utilized is aluminum (or aluminum alloy) treated as described here below. The parts of the housing 22 are hung from a frame (not shown) to be immersed in a bath for the following treatments that are of both a chemical and an electrolytic type. Firstly surfactant degreasing is carried out. Then glazing is carried out in a hot bath (at approx. 50° C.) containing dissolved aluminum and caustic soda, thus obtaining leveling or smoothing of the surface. After rinsing, de-coating or depatination is carried out in an acid solution. The above-mentioned parts of housing 22 are then treated with a suitable process of electrolytic anodizing, thus obtaining a thin coating which, well anchored to the base, gradually increases the hardness close to the surfaces.

The previous electrochemical treatment of the leveled surface causes the surface 10 to be microporous. Following this is a chemical treatment. After a series of washings at room temperature, the parts are immersed in a hot bath of demineralized water at approximately 90° C. Thus, "sealing" of the micropores is obtained with a process of hydration. A surface finishing is obtained which enables the pasta to run smoothly without the occurrence of adhesion. Surface solidity and hardness prevent the particles from being released on the pasta. Another advantage of the process described above is the option of obtaining, if one wants, machine housing pigmentation, without risk of particles being released which could occur when varnishes are applied.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A pasta machine with improved housing, the housing comprising:
    at least one pasta contacting part of the housing having a substantially non-stick microroughness surface determined by a microporous layer of aluminum oxide and sealing of the micropores with a hydration treatment.

2. The pasta machine of claim 1 wherein the microroughness surface is determined by a microporous layer of aluminum oxide in an Al2O3 crystalline form.

3. The pasta machine of claim 1 wherein the microroughness surface is determined by a microporous layer of aluminum oxide in an amorphous material form.

4. The pasta machine of claim 1 wherein the microroughness surface is determined by a microporous layer of aluminum oxide in both the Al2O3 crystalline form and in an amorphous material form.

5. The pasta machine of claim 1 wherein the at least one pasta contacting part of the housing has a pigmented surface, formed by depositing pigments at the bottom of the micropores of the surface before sealing of the micropores.

6. The pasta machine of claim 5 wherein the pigment is generally organic.

7. The pasta machine of claim 1 wherein the surface layer of the pasta contacting parts of the housing composed of aluminum oxide is made of an anti-fatigue material to minimize the release of particles that are detached while the pasta is being worked.

8. Pasta machine with improved housing characterized by the fact that improvement of the housing surface is obtained proceeding as follows:
    degreasing with surfactant;
    bath glazing at approximately 50° C. with dissolved aluminum and caustic soda;
    acid solution depatination;
    electrolytic anodizing treatment;
    deposit of color pigments at bottom of pores prior to sealing;
    pore sealing by hydration at approximately 90° C.

* * * * *